United States Patent
Yang

(10) Patent No.: US 11,785,559 B2
(45) Date of Patent: Oct. 10, 2023

(54) ANTENNA CONTROL METHOD AND SYSTEM AND ELECTRONIC DEVICE

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 223 days.

(21) Appl. No.: 17/378,542

(22) Filed: Jul. 16, 2021

(65) Prior Publication Data

US 2021/0345258 A1 Nov. 4, 2021

Related U.S. Application Data

(63) Continuation of application No. PCT/CN2020/070106, filed on Jan. 2, 2020.

(30) Foreign Application Priority Data

Jan. 28, 2019 (CN) .................... 201910082404.2
Mar. 25, 2019 (CN) .................... 201910226175.7

(51) Int. Cl.
*H04W 52/42* (2009.01)
*H04B 1/3827* (2015.01)
*H04B 1/44* (2006.01)

(52) U.S. Cl.
CPC .......... *H04W 52/42* (2013.01); *H04B 1/3838* (2013.01); *H04B 1/44* (2013.01)

(58) Field of Classification Search
CPC ... H04W 52/42; H04W 52/367; H04W 88/06; H04B 1/3838; H04B 1/44; H04B 17/102;
(Continued)

(56) References Cited

U.S. PATENT DOCUMENTS 9,306,526 B2 * 4/2016 Lam .................... H04B 1/48
9,948,328 B2 * 4/2018 Wang .................. H04B 1/0057
(Continued)

FOREIGN PATENT DOCUMENTS

CN 102270999 A 12/2011
CN 103067038 A 4/2013
(Continued)

OTHER PUBLICATIONS

The Extended European Search Report dated Feb. 2, 2022 from European Application No. 20748076.5.
(Continued)

*Primary Examiner* — Lana N Le

(74) *Attorney, Agent, or Firm* — Quarles & Brady LLP

(57) ABSTRACT

An antenna control method for an electronic device is provided. The method includes: obtaining, in response to the electronic device radiating first antenna signals and second antenna signals simultaneously, a combination electromagnetic wave specific absorption rate (SAR) of at least one first antenna and at least one of a plurality of second antennas in an operating state; calling, in response to the combination electromagnetic wave SAR not meeting a predetermined condition, a target antenna combination including a first target antenna and a second target antenna; and controlling the first target antenna and the second target antenna to be in the operating state for radiating the first antenna signals and the second antenna signals simultaneously. An antenna control system and an electronic device are also provided.

20 Claims, 11 Drawing Sheets

(58) Field of Classification Search
CPC .... H04B 1/401; H04B 7/0404; H04B 7/0608; H04B 17/101; H04B 17/12; H04B 7/0825; H04B 7/04; H04B 7/0834; H04B 7/06; H04B 1/0064
See application file for complete search history.

(56) References Cited

U.S. PATENT DOCUMENTS

| | | | |
|---|---|---|---|
| 2014/0091968 | A1 | 4/2014 | Harel et al. |
| 2016/0278023 | A1* | 9/2016 | Kishiyama ............ H04W 52/42 |
| 2017/0373712 | A1* | 12/2017 | Kim ..................... H04B 1/3838 |
| 2018/0316379 | A1* | 11/2018 | Chang ................... H01Q 1/245 |
| 2020/0228074 | A1* | 7/2020 | Naniwa ................ H05K 1/0243 |
| 2021/0127256 | A1* | 4/2021 | Li ......................... H04W 88/06 |
| 2022/0006539 | A1* | 1/2022 | Sun ..................... H04B 7/0404 |

FOREIGN PATENT DOCUMENTS

| | | | |
|---|---|---|---|
| CN | 106850100 | A | 6/2017 |
| CN | 107733447 | A | 2/2018 |
| CN | 108259056 | A | 7/2018 |
| CN | 207766262 | A | 8/2018 |
| CN | 207766262 | U | 8/2018 |
| CN | 108599760 | A | 9/2018 |
| CN | 108668353 | A | 10/2018 |
| CN | 108832281 | A | 11/2018 |
| CN | 109962719 | A | 7/2019 |
| EP | 2928086 | A2 | 10/2015 |

OTHER PUBLICATIONS

Notice of Allowance dated Jun. 10, 2021 from from China Application No. 201910226175.7.

International Search Report and the Written Opinion dated Mar. 23, 2020 from the International Searching Authority Re. Application No. PCT/CN2020/070106.

The First Office Action dated Mar. 2, 2020 from China Application No. 201910226175.7.

The Second Office Action dated Aug. 20, 2020 from China Application No. 201910226175.7.

The Notice of Rejection dated Dec. 2, 2020 from China Application No. 201910226175.7.

\* cited by examiner

When the electronic device radiates the first antenna signals and the second antenna signals simultaneously, a combination electromagnetic wave specific absorption rate (SAR) of the at least one first antenna in an operating state and at least one of the second antennas in the operating state which radiate the first antenna signals and the second antenna simultaneously is obtained ⟶ 210

A target antenna combination including a first target antenna and a second target antenna is called when the combination electromagnetic wave SAR does not meet a predetermined condition ⟶ 220

The first target antenna is controlled to be in the operating state for radiating the first antenna signals, and the second target antenna is controlled to be in the operating state for radiating the second antenna signals simultaneously ⟶ 230

FIG. 2

ANTENNA CONTROL METHOD AND SYSTEM AND ELECTRONIC DEVICE

CROSS REFERENCE TO RELATED APPLICATIONS

This application is a continuation of International Application No. PCT/CN2020/070106, filed on Jan. 2, 2020, which claims priorities to Chinese patent application No. 201910082404.2, filed on Jan. 28, 2019, and Chinese patent application No. 201910226175.7, filed on Mar. 25, 2019, the contents of which are incorporated herein by reference in their entirety.

FIELD OF DISCLOSURE

The present disclosure relates to the communication technology field, and more particularly to an antenna control method and system and an electronic device.

BACKGROUND

An electromagnetic wave specific absorption rate (SAR) is an important indicator to measure the radiation of a wireless terminal product with communication functions to a human body. The electromagnetic wave SAR refers to an electromagnetic power absorbed or consumed per unit mass by a human tissue and has a unit of W/kg. The electromagnetic wave SAR represents the impact of radiation on the human body. When the SAR value is lower, the absorbed radiation is less.

SUMMARY OF DISCLOSURE

The present disclosure provides an antenna control method and system and an electronic device.

One embodiment of the present disclosure provides an antenna control method for an electronic device. The electronic device including at least one first antenna for radiating first antenna signals and a plurality of second antennas for radiating second antenna signals. The method includes: obtaining, in response to the electronic device radiating the first antenna signals and the second antenna signals simultaneously, a combination electromagnetic wave specific absorption rate (SAR) of the at least one first antenna and at least one of the plurality of second antennas in an operating state; calling, in response to the combination electromagnetic wave SAR not meeting a predetermined condition, a target antenna combination including a first target antenna and a second target antenna; and controlling the first target antenna and the second target antenna to be in the operating state for radiating the first antenna signals and the second antenna signals simultaneously.

One embodiment of the present disclosure provides an antenna control system. The antenna control system includes at least one first antenna configured to radiate first antenna signals, a plurality of second antennas configured to radiate second antenna signals; a monitoring circuit configured to monitor operating states of the at least one first antenna and the plurality of second antennas; and a radio frequency processing circuit connected to the at least one first antenna and the plurality of second antennas and configured to perform: obtaining, in response to the at least one first antenna and the plurality of second antennas radiating the first antenna signals and the second antenna signals simultaneously, a combination electromagnetic wave specific absorption rate (SAR) of the at least one first antenna and at least one of the plurality of second antennas in the operating state; calling, in response to the combination electromagnetic wave SAR not meeting a predetermined condition, a target antenna combination including a first target antenna and a second target antenna; and controlling the first target antenna and the second target antenna to be in the operating state for radiating the first antenna signals and the second antenna signals simultaneously.

One embodiment of the present disclosure provides an electronic device. The electronic device includes at least one first antenna for radiating first antenna signals, a plurality of second antennas for radiating second antenna signals, a monitoring circuit, a radio frequency processing circuit, at least one memory, and at least one processor. The at least one memory includes computer programs stored thereon. The computer programs are configured to, with the at least one processor, cause the electronic device to perform: obtaining, in response to the electronic device radiating the first antenna signals and the second antenna signals simultaneously, a combination electromagnetic wave specific absorption rate (SAR) of the at least one first antenna and at least one of the plurality of second antennas in an operating state; calling, in response to the combination electromagnetic wave SAR not meeting a predetermined condition, a target antenna combination including a first target antenna and a second target antenna; and controlling the first target antenna and the second target antenna to be in the operating state for radiating the first antenna signals and the second antenna signals simultaneously.

The additional aspects and advantages of the present disclosure will be given partially in the following description, part of them will become obvious from the following description, or be learnt via the practice of the present disclosure.

BRIEF DESCRIPTION OF DRAWINGS

The above-mentioned and/or additional aspects and advantages of the present disclosure will become obvious and be easily understood from the description of embodiments in combination with the following accompanying drawings, in which:

FIG. 2 illustrates a flowchart of an antenna control method in one embodiment of the present disclosure;

DETAILED DESCRIPTION OF EMBODIMENTS

In order to better understand the disclosure for those skilled in the art, the technical solutions in the embodiments of the present disclosure are clearly and completely described in the following with reference to the accompanying drawings in the embodiments of the present disclosure.

It can be understood that the terms "first", "second" and the like, as used herein, can be used to describe various elements, but these elements are not limited by these terms. These terms are only used to distinguish one element from another. For example, a first switch can be referred to as a second switch without departing from the scope of the present disclosure, and similarly, a second switch can be referred to as a first switch. Both the first switch and the second switch are switches, but they are not the same switch.

Figure 1:
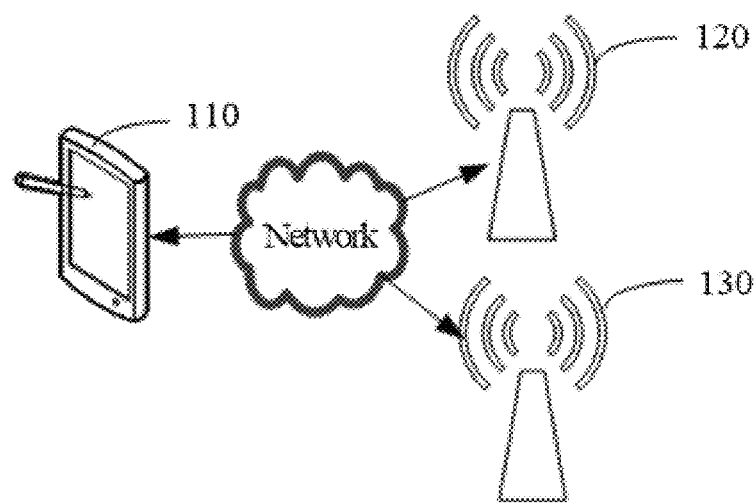
FIG. 1 illustrates a schematic diagram of an application environment of an antenna control method in one embodiment.

FIG. 1 illustrates a schematic diagram of an application environment of an antenna control method in one embodiment. As shown in FIG. 1, the application environment includes an electronic device 110 and two base stations including a first base station 120 and a second base station 130 which are connected to the electronic device 110, respectively. The first base station 120 and the second base station 130 are used for signal transmission with the electronic device 110.

FIG. 2 illustrates a flowchart of an antenna control method in one embodiment of the present disclosure. The antenna control method is for the electronic device 110. The electronic device 110 includes at least one first antenna for radiating first antenna signals and a plurality of second antennas for radiating second antenna signals.

In the embodiment of the present disclosure, the electronic device 110 can be a mobile terminal, a tablet computer, a personal digital assistant (PDA), a point of sales (POS), a vehicle-mounted computer, a wearable device or the like.

The first antenna can be a third-generation (3G) antenna, a fourth-generation (4G) antenna, a fifth-generation (5G) antenna, a Wireless Fidelity (WiFi) antenna or the like. The second antenna can also be a 3G antenna, a 4G antenna, a 5G antenna, a WiFi antenna or the like. The types of the at least one first antenna and the second antennas are not limited.

As shown in FIG. 2, the antenna control method includes operation 210 to operation 230.

In operation 210, when the electronic device 110 radiates the first antenna signals and the second antenna signals simultaneously, a combination electromagnetic wave specific absorption rate (SAR) of the at least one first antenna in an operating state and at least one of the second antennas in the operating state which radiate the first antenna signals and the second antenna simultaneously is obtained.

In one embodiment, the electronic device 110 can monitor a network residence state of the electronic device 110 via a built-in monitoring function. The network residence state includes a 3G single connectivity mode, a 4G single connectivity mode, a 5G single connectivity mode, a 3G/4G dual connectivity mode, a 3G/5G dual connectivity mode, a 4G/5G dual connectivity mode, a WiFi hotspot mode or the like. Take the electronic device 110 of an Android system as an example. A system-level monitoring function can be established in a system framework layer (a native/framework layer). The network residence state of the electronic device 110 can be monitored via the monitoring function. Alternatively, a monitoring process can be established independently. The network residence state of the electronic device 110 is monitored via a message transmission mechanism. Furthermore, an independent monitoring process can also be established, and an individual monitoring function can be established and called in the process. The monitoring function can be set to start automatically after the electronic device 110 is powered on to monitor the network residence state of the electronic device 110 in real time.

Optionally, the network residence state of the electronic device 110 can be monitored by a monitoring circuit, so that the monitoring circuit is configured to monitor the operating states of the at least one first antenna and the second antennas. The monitoring circuit can be a modulator/demodulator (MODEM) or the like. The monitoring circuit can also be an application chip (application processor, i.e., AP chip).

For example, when it is monitored that the electronic device 110 is in the 4G/5G dual connectivity mode, the at least one 4G antenna and the 5G antennas of the electronic device 110 radiate the first antenna signals and the second antenna signals simultaneously, a signal strength, when the at least one 4G antenna and the 5G antennas radiate the first antenna signals and the second antenna signals simultaneously, is obtained, and a current combination electromagnetic wave SAR is obtained according to the signal strength. The combination electromagnetic wave SAR is a maximum electromagnetic wave SAR which is generated when the at least one 4G antenna and the 5G antennas the first antenna signals and the second antenna signals simultaneously.

As another example, when it is monitored that the electronic device 110 is in the WiFi hotspot mode (for example, 5G signals are converted into WiFi signals and radiated out), at least one WiFi antenna and 5G antennas of the electronic device 110 radiate the first antenna signals and the second antenna signals simultaneously, a signal strength, when the at least one WiFi antenna and the 5G antennas radiate the first antenna signals and the second antenna signals simultaneously, is obtained, and a current combination electromagnetic wave SAR is obtained according to the signal strength. The combination electromagnetic wave SAR is a maximum electromagnetic wave SAR which is generated when the at least one WiFi antenna and the 5G antennas radiate the first antenna signals and the second antenna signals simultaneously.

In operation 220, a target antenna combination including a first target antenna and a second target antenna is called when the combination electromagnetic wave SAR does not meet a predetermined condition.

The predetermined condition can be that an electromagnetic wave SAR of the radiated signals of the electronic device 110 meets an international standard. Internationally, the SAR is used for measuring whether electromagnetic radiation on a human body generated by a communication device is safe. When the SAR is smaller, the damage to the human body is smaller. In contrast, when the SAR is greater, the damage to the human body is greater. The SAR has a unit of mw/g. Generally, the SAR includes two standards: a CE standard and an FCC standard. The CE standard is 2 mw/g, and the FFC standard is 1.6 mw/g. The predetermined condition can be one of the above-mentioned two standards or a standard designated by the country. The embodiment of the present disclosure is not limited.

In one embodiment, the predetermined condition is the CE standard. When the current SAR of the electronic device 110 does not meet the CE standard, the target antenna combination including the first target antenna and the second target antenna is called. The first target antenna can be the at least one first antenna, and the second target antenna can be one of the second antennas. When the at least one first target antenna and the second target antennas radiate the first antenna signals and the second antenna signals simultaneously, the SAR of the signals which the first target antenna and the second target antenna of the electronic device 110 radiate the first antenna signals and the second antenna signals simultaneously meets the CE standard.

In one embodiment, a plurality of predetermined antenna combinations can be pre-stored in the electronic device 110. Each of the predetermined antenna combinations can include one first antenna and one second antenna, one first antenna and two second antennas, two first antennas and one second antenna, or two first antennas and two second antennas. When the antennas of each of the predetermined antenna combinations radiate the first antenna signals and the second antenna signals simultaneously, the combination SAR meets the CE standard. When the SAR does not meet the CE standard, one of the predetermined antenna combinations can be called via a software program to serve as the target antenna combination, or can be called in other ways. The specific calling method is not limited in the present implementation.

In operation 230, the first target antenna is controlled to be in the operating state for radiating the first antenna signals, and the second target antenna is controlled to be in the operating state for radiating the second antenna signals simultaneously.

When the current SAR of the electronic device 110 does not meet the CE standard, the target antenna combination including the first target antenna and the second target antenna is called to switch at least one first antenna currently in the operating state to the first target antenna and to switch at least one second antenna currently in the operating state to the second target antenna. Alternatively, the at least one second antenna currently in the operating state is switched to the second target antenna. In the meantime, the at least one first antenna currently in the operating state is the first target antenna and thus is not required to be switched.

Optionally, the calling can be executed via a hardware module of the electronic device 110 or can be executed via software.

By this control method, the first target antenna and the second target antenna can radiate the antenna signals simultaneously, and the combination SAR can be ensured to meet the CE standard.

In order to improve the communication quality and meet the needs of users, the electronic device 110 can be provided with a plurality of antennas respectively corresponding to a plurality of base stations to establish communication links. However, radiation fields generated by the antennas are superimposed. This results in the combination SAR value of the antennas to be higher than the SAR value of any one of the antennas which is operated alone, so that the combination SAR value exceeds the standard. In the antenna control method of the present embodiment, when the electronic device 110 radiates the first antenna signals and the second antenna signals simultaneously, the combination electromagnetic wave SAR of the at least one first antenna currently in the operating state and the at least one second antenna currently in the operating state is obtained. When the combination electromagnetic wave SAR does not meet the predetermined condition, the target antenna combination including the first target antenna and the second target antenna is called. The first target antenna is controlled to be in the operating state for radiating the first antenna signals, and the second target antenna is controlled to be in the operating state for radiating the second antenna signals simultaneously. As such, the combination SAR can be decreased when a plurality of antennas are operated simultaneously.

In one embodiment, the at least one first antenna includes a plurality of first antennas. The electronic device 110 can include a first radio frequency circuit, a second radio frequency circuit, a first switch connected between the first radio frequency circuit and the plurality of first antennas, and a second switch connected between the second radio frequency circuit and the plurality of second antennas. The first switch is controlled to turn on a connecting path from the first radio frequency circuit to the first target antenna, and the second switch is controlled to turn on a connecting path from the second radio frequency circuit to the second target antenna, so that the first target antenna and the second target antenna radiate the first antenna signals and the second antenna signals simultaneously.

In the present implementation, the first switch can be a double-pole double-throw switch. The second switch can be a four-pole four-throw switch. It should be noted that the types of the first switch and the second switch are not limited in the present embodiment.

In one embodiment, the at least one first antenna is a 4G antenna, and the second antennas are 5G antennas. Correspondingly, the first antenna signals radiated by the at least one first antenna are 4G signals, and the second antenna signals radiated by the second antennas are 5G signals.

The electronic device 110 can include a plurality of 4G antennas and a plurality of 5G antennas. It should be noted that n the present disclosure, "a plurality of" can be understood as at least two (greater than or equal to 2). That is "a plurality of" is 2, 3 or even more.

In the present embodiment, there are two 4G antennas including an upper antenna and a lower antenna, and there are four 5G antennas including a 5G antenna 1, a 5G antenna 2, a 5G antenna 3, and a 5G antenna 4.

When it is monitored that the electronic device 110 is in the 4G/5G dual connectivity mode, the 4G antennas and the 5G antennas of the electronic device 110 radiate signals simultaneously, a signal strength, when the 4G antennas and the 5G antennas radiate the signals simultaneously, is obtained, and a current combination SAR is obtained according to the signal strength. When the combination SAR does not meet the CE standard, at least one of the 4G antennas currently in the operating state is controlled to be switched to the first target antenna, and at least one of the 5G antennas currently in the operating state is controlled to be switched to the second target antenna, so that the first target antenna and the second target antenna radiate the antenna signals simultaneously, and the combination SAR can be ensured to meet the CE standard.

Figure 3:
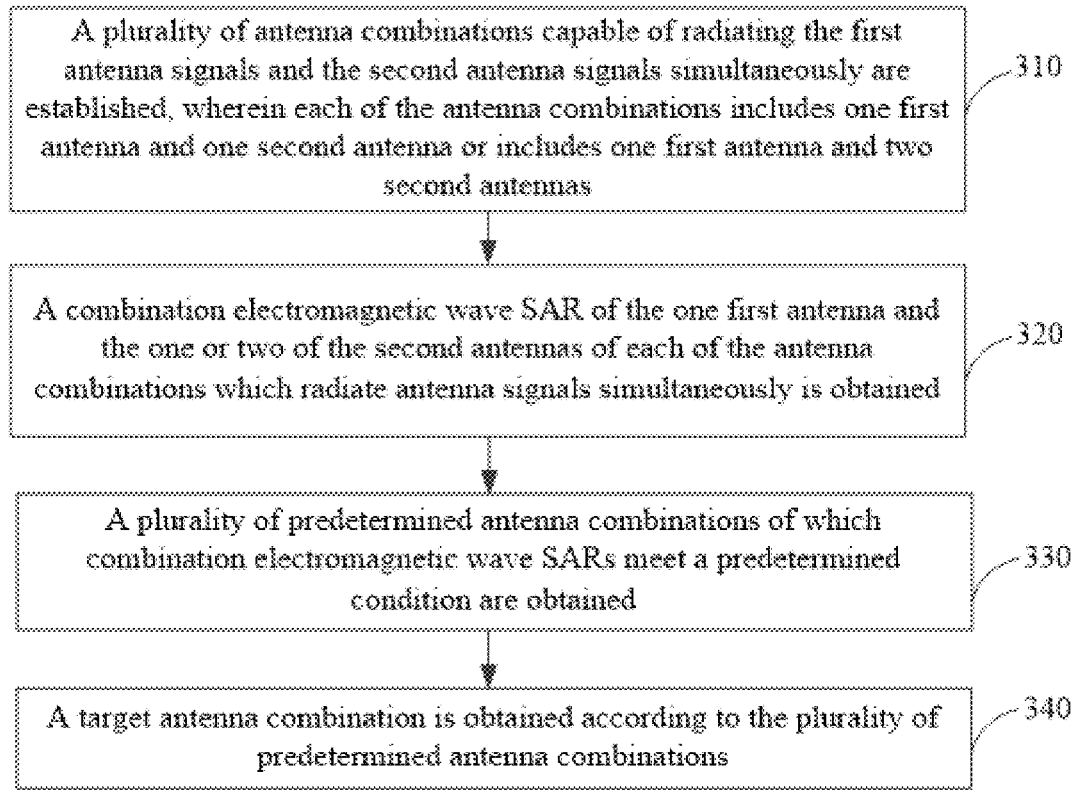
FIG. 3 illustrates a flowchart of a method for obtaining a predetermined antenna combinations according to one embodiment of the present disclosure.

FIG. 3 illustrates a flowchart of a method for obtaining a plurality of predetermined antenna combinations according to one embodiment of the present disclosure. The method includes operation 310 to operation 340.

In operation 310, a plurality of antenna combinations capable of radiating the first antenna signals and the second antenna signals simultaneously are established, wherein each of the antenna combinations includes one first antenna and one second antenna or includes one first antenna and two second antennas.

In operation 320, a combination electromagnetic wave SAR of the one first antenna and the one or two of the second antennas of each of the antenna combinations which radiate antenna signals simultaneously is obtained.

In operation 330, a plurality of predetermined antenna combinations of which combination electromagnetic wave SARs meet a predetermined condition are obtained.

In operation 340, a target antenna combination is obtained according to the plurality of predetermined antenna combinations.

In the present embodiment, for example, there are two 4G antennas including an upper antenna and a lower antenna, and there are four 5G antennas including a 5G antenna 1, a 5G antenna 2, a 5G antenna 3, and a 5G antenna 4. An antenna combination mode can include a 1T4R mode and a 2T4R mode. In the 1T4R mode, one 4G antenna and one 5G antenna radiate signals simultaneously. In the 2T4R mode, one 4G antenna and two 5G antennas radiate signals simultaneously. Therefore, a plurality of different antenna combinations can be established. In the 1T4R mode, eight different antenna combinations can be established. In the 2T4R mode, twelve different antenna combinations can be established.

For each of the antenna combinations, the combination SAR of the electronic device 110 when antennas of each of the antenna combinations radiate the signals is obtained and recorded. Finally, twenty combination SARs corresponding to twenty different antenna combinations are obtained. A plurality of combination SARs which meet the CE standard are selected from the twenty combination SARs, so that plurality of antenna combinations which meet the CE standard can be obtained. The plurality of antenna combinations which meet the CE standard are stored in the electronic device 110 for calling.

In another embodiment, the at least one first antenna is a first target antenna. The electronic device 110 can include a second switch connected to a plurality of second antennas. The first target antenna is controlled to be in an operating state, and the second switch is controlled to turn on a connecting path to a second target antenna, so that the first target antenna and the second target antenna radiate antenna signals simultaneously.

In the present implementation, the connecting path to the first target antenna is directly turned on, and thus it is not required to be turned on via a switch. The second switch can be a four-pole four-throw switch. It should be noted that the type of the second switch is not limited in the present embodiment.

In one embodiment, the at least one first antenna is a WiFi antenna, and the second antennas are 5G antennas. Correspondingly, the first antenna signals radiated by the at least one first antenna are WiFi signals, and the second antenna signals radiated by the second antennas are 5G signals.

The electronic device 110 can include at least one WiFi antenna and a plurality of 5G antennas. It should be noted that in the present disclosure, "a plurality of" can be understood as at least two (greater than or equal to 2). That is, "a plurality of" is 2, 3 or even more. A number of the at least one WiFi antenna can be 1, 2 or 4.

In the present embodiment, there are two WiFi antennas including a WiFi antenna 1 and a Win antenna 2, and there are four 5G antennas including a 5G antenna 1, a 5G antenna 2, a 5G antenna 3, and a 5G antenna 4.

When it is monitored that the electronic device 110 is in the WiFi hotspot mode, the WiFi antennas and the 5G antennas of the electronic device 110 radiate signals simultaneously, a signal strength, when the WiFi antennas and the 5G antennas radiate simultaneously, is obtained, and a current combination SAR of the electronic device 110 is obtained according to the signal strength. When the combination SAR does not meet the CE standard, at least one of the 5G antennas currently in the operating state can be controlled to switch to the second target antenna, so that the first target antenna and the second target antenna radiate antenna signals simultaneously, and the combination SAR can be ensured to meet the CE standard.

Figure 4:
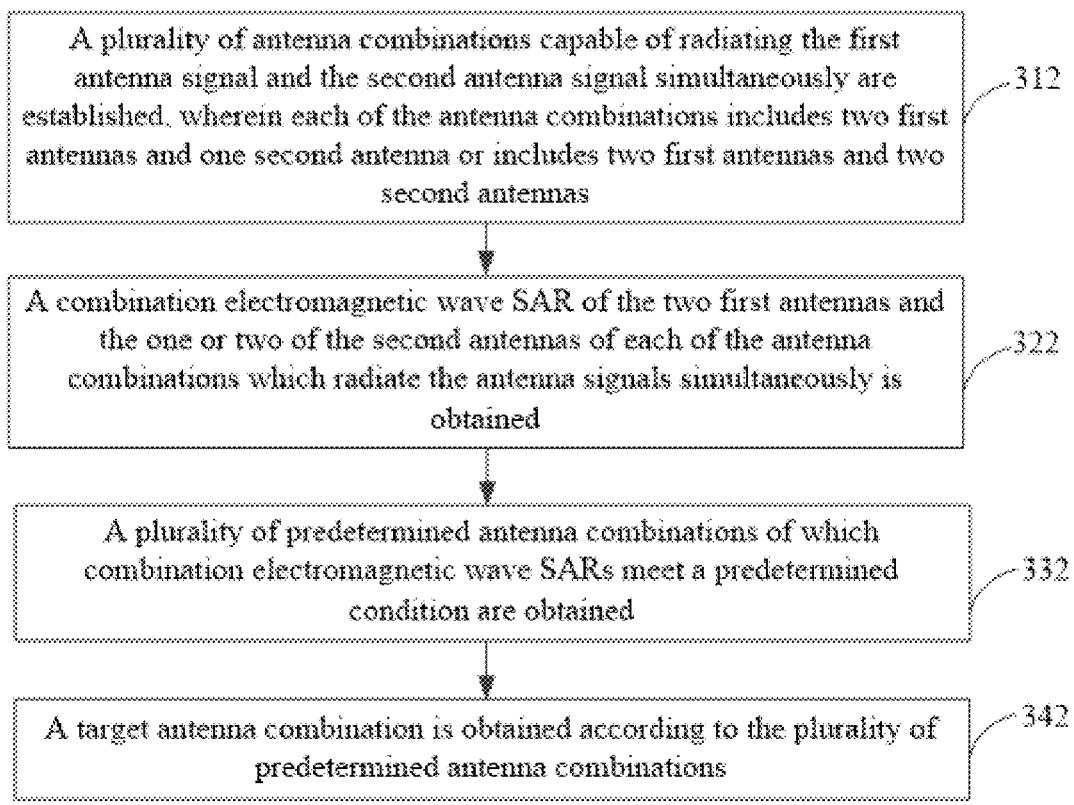
FIG. 4 illustrates a flowchart of a method for obtaining a predetermined antenna combinations according to another embodiment of the present disclosure.

FIG. 4 illustrates a flowchart of a method for obtaining a plurality of predetermined antenna combinations according to another embodiment of the present disclosure. The method includes operation 312 to operation 342.

In operation 312, a plurality of antenna combinations capable of radiating the first antenna signal and the second antenna signal simultaneously are established, wherein each of the antenna combinations includes two first antennas and one second antenna or includes two first antennas and two second antennas.

In operation 322, a combination electromagnetic wave SAR of the two first antennas and the one or two of the second antennas of each of the antenna combinations which radiate the antenna signals simultaneously is obtained.

In operation 332, a plurality of predetermined antenna combinations of which combination electromagnetic wave SARs meet a predetermined condition are obtained.

In operation 342, a target antenna combination is obtained according to the plurality of predetermined antenna combinations.

In the present embodiment, for example, there are two WiFi antennas including a WiFi antenna 1 and a WiFi antenna 2, and there are four 5G antennas including a 5G antenna 1, a 5G antenna 2, a 5G antenna 3, and a 5G antenna 4. An antenna combination mode can include a 1T4R mode and a 2T4R mode. In the 1T4R mode, two WiFi antennas and one 5G antenna radiate signals simultaneously. In the 2T4R mode, two WiFi antennas and two 5G antennas radiate signals simultaneously. Therefore, a plurality of different antenna combinations can be established. In the 1T4R mode, four different antenna combinations can be established. In the 2T4R mode, six different antenna combinations can be established.

For each of the antenna combinations, the combination SAR of the electronic device 110 when antennas of each of the antenna combinations radiate the signals is obtained and recorded. Finally, ten combination SAR s corresponding to ten different antenna combinations are obtained. A plurality of combination SAR which meet the CE standard are selected from the ten combination SARs, so that a plurality of antenna combinations which meet the CE standard can be obtained. The plurality of antenna combinations which meet the CE standard are stored the electronic device 110 for calling.

In one embodiment, for each of the antenna combinations, obtaining the combination electromagnetic wave SAR of the first antennas and the second antennas which radiate the antenna signals simultaneously includes: obtaining a maximum transmission power of at least one first antenna and a maximum transmission power of at least one second antenna; and obtaining, according to the maximum transmission power of the at least one first antenna and the maximum transmission power of the at least one second antenna, the combination electromagnetic wave SAR of the at least one first antenna and the at least one second antenna which radiate the antenna signals simultaneously.

When the at least one first antenna transmits the signals using the maximum transmission power and the at least one second antenna transmits the signals using the maximum transmission power and at least one antenna combination which meets the predetermined condition is not obtained, the maximum transmission power of the at least one first antenna and/or the maximum transmission power of the at least one second antenna is decreased until the at least one antenna combination which meets the predetermined condition is obtained.

In the embodiment of the present disclosure, the maximum transmission power of the at least one first antenna and the maximum transmission power of the at least one second antenna are obtained. The combination electromagnetic wave SAR of the at least one first antenna and the at least one second antenna which radiate the antenna signals simultaneously is obtained according to the maximum transmission power of the at least one first antenna and the maximum transmission power of the at least one second antenna. When the at least one antenna combination which meets the predetermined condition is not obtained, the maximum transmission power of the at least one first antenna and/or the maximum transmission power of the at least one second antenna is decreased until the at least one antenna combination which meets the predetermined condition is obtained. As such, the at least one antenna combination which meets the maximum transmission powers of the SAR standard can be selected.

Figure 5:
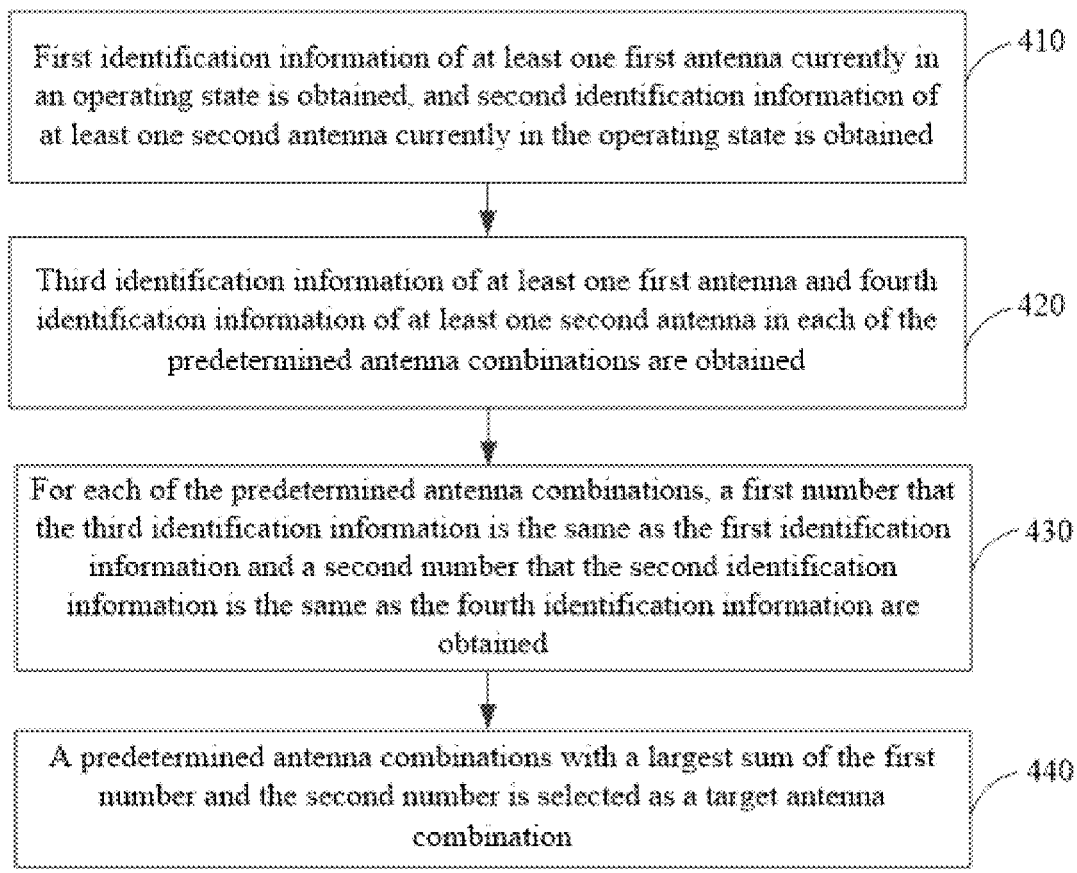
FIG. 5 illustrates a flowchart of a method for obtaining a target antenna combination according to a plurality of predetermined antenna combinations according to one embodiment of the present disclosure.

FIG. 5 illustrates a flowchart of a method for obtaining a target antenna combination according to a plurality of predetermined antenna combinations according to one embodiment of the present disclosure. The method includes operation 410 to operation 440.

In operation 410, first identification information of at least one first antenna currently in an operating state is obtained, and second identification information of at least one second antenna currently in the operating state is obtained.

In operation 420, third identification information of at least one first antenna and fourth identification information of at least one second antenna in each of the predetermined antenna combinations are obtained.

In operation 430, for each of the predetermined antenna combinations, a first number that the third identification information is the same as the first identification information and a second number that the second identification information is the same as the fourth identification information are obtained.

In operation 440, a predetermined antenna combination with a largest sum of the first number and the second number is selected as a target antenna combination.

In one embodiment, each antenna carries corresponding identification information, and the identification information uniquely identifies that each antenna belongs to which one of a plurality of antennas. The corresponding antenna can be obtained by identifying the identification information. The identification information can be any combinations of numbers, letters, symbols or the like. A specific form is not limited.

In one embodiment, the identification information consists of numbers. For example, a number "1" can be used for representing an upper antenna of a 4G antenna, a number "2" can represent a lower antenna of a 4G antenna, a number "3" can represent a 5G antenna 1, a number "4" can represent a 5G antenna 2, a number "5" can represent a 5G antenna 3, and a number "6" can represent a 5G antenna 4.

For example, when the electronic device 110 is in the 4G/5G dual connectivity mode and a current combination SAR of the electronic device 110 does not meet the CE standard, first identification information of the at least one 4G antenna currently in the operating state is obtained and second identification information of the at least one 5G antenna currently in the operating state is obtained. Then, third identification information of at least one 4G antenna and fourth identification information of the at least one 5G antenna in each predetermined antenna combination are obtained. It is determined whether the first identification information and the third identification information are the same, and it is determined whether the second identification information and the fourth identification information are the same. A target antenna combination is obtained by obtaining the first number that the third identification information is the same as the first identification information and the second number that the second identification information is the same as the fourth identification information.

In one embodiment, the at least one 4G antenna currently in the operating state includes the upper antenna, and the at least one 5G antenna currently in the operating state includes the 5G antenna 1. The obtained first identification information includes "1", and the second identification information includes "3". Assuming that there are two antenna combinations which meet the predetermined condition. That is, there are two predetermined antenna combinations including a predetermined set 1 of antenna combinations and a predetermined set 2 of antenna combinations. The predetermined set 1 of antenna combinations includes the upper antenna and the 5G antenna 3, and the predetermined set 2 of antenna combinations includes the lower antenna and the 5G antenna 4. The third identification information obtained from the predetermined set 1 of antenna combinations includes "1". The fourth identification information obtained from the predetermined set 1 of antenna combinations 1 includes "5". The third identification information obtained from the predetermined set 2 of antenna combinations is "2". The fourth identification information obtained from the predetermined set 2 of antenna combinations is "6". After comparisons, in the predetermined set 1 of antenna combinations, the number that the first identification information is the same as the third identification information is 1, and the number that the second identification information is the same as the fourth identification information is 0. That is, a total number is 1. In the predetermined set 2 of antenna combinations, the number that the first identification information is the same as the third identification information is 0, and the number that the second identification information is the same as the fourth identification information is 0. That is, a total number is 0. Therefore, the predetermined set 1 of antenna combinations is called as the target antenna combination. The SAR, when the at least one first antenna and the at least one second antenna of the electronic device 110 radiate the signals simultaneously, can meet the CE standard by only switching the second antenna (i.e., the 5G antenna 1) currently in the operating state to the 5G antenna 3.

In another embodiment, the identification information consists of letters. For example, a letter "A" can be used for representing a WiFi antenna 1, a letter "B" can be used for representing a WiFi antenna 2, a letter "C" can be used for representing a 5G antenna 1, a letter "D" can be used for representing a 5G antenna 2, a letter "E" can be used for representing a 5G antenna 3, and a letter "F" can be used for representing a 5G antenna 4.

For example, when the electronic device 110 is in the WiFi hotspot mode and a current combination SAR of the electronic device 110 does not meet the CE standard, first identification information of at least one WiFi antenna currently in the operating state is obtained and second identification information of at least one 5G antenna currently in the operating state is obtained. Then, third identification information of at least one WiFi antenna and fourth identification information of at least one 5G antenna in each predetermined antenna combination are obtained. It is determined whether the first identification information and the third identification information are the same, and it is determined whether the second identification information and the fourth identification information are the same. A target antenna combination is obtained by obtaining the first number that the third identification information is the same as the first identification information and the second number that the second identification information is the same as the fourth identification information.

In one embodiment, the WiFi antenna 1 and the WiFi antenna 2 are both in the operating state, and the 5G antennas currently in the operating state includes the 5G antenna 3 and the 5G antenna 4. The obtained first identification information includes "A" and "B", and the second identification information includes "E" and "F". Assuming that there are two antenna combinations which meet the predetermined condition. That is, there are two predetermined antenna combinations including a predetermined set 1 of antenna combinations and a predetermined set 2 of antenna combinations. The predetermined set 1 of antenna combinations includes the WiFi antenna 1, the WiFi antenna 2, the 5G antenna 1, and the 5G antenna 2. The predetermined set 2 of antenna combinations includes the WiFi antenna 1, the WiFi antenna 2, the 5G antenna 1, and the 5G antenna 3. The third identification information obtained from the predetermined set 1 of antenna combinations includes "A" and "B". The fourth identification information obtained from the predetermined set 1 of antenna combinations 1 includes "C" and "D". The third identification information obtained from the predetermined set 2 of antenna combinations includes "A" and "B". The fourth identification information obtained from the predetermined set 2 of antenna combinations includes "C" and "E". After comparisons, in the predetermined set 1 of antenna combinations, the number that the first identification information is the same as the third identification information is 2, and the number that the second identification information is the same as the fourth identification information is 0. That is, a total number is 2. In the predetermined set 2 of antenna combinations, the number that the first identification information is the same as the third identification information is 2, and the number that the second identification information is the same as the fourth identification information is 1. That is, a total number is 3. Therefore, the predetermined set 2 of antenna combinations is called as the target antenna combination. The SAR, when the at least one first antenna and the at least one second antenna of the electronic device 110 radiate the signals simultaneously, can meet the CE standard by only switching the second antenna (i.e., the 5G antenna 4) currently in the operating state to the 5G antenna 1.

In the embodiment of the present disclosure, a network interruption caused by switching a large number of antennas can be reduced by preferentially calling a predetermined antenna combination with a small number of switching antennas as a target antenna combination.

In one embodiment, one of a plurality of predetermined antenna combinations can also be randomly selected to increase the switching speed.

Figure 6:
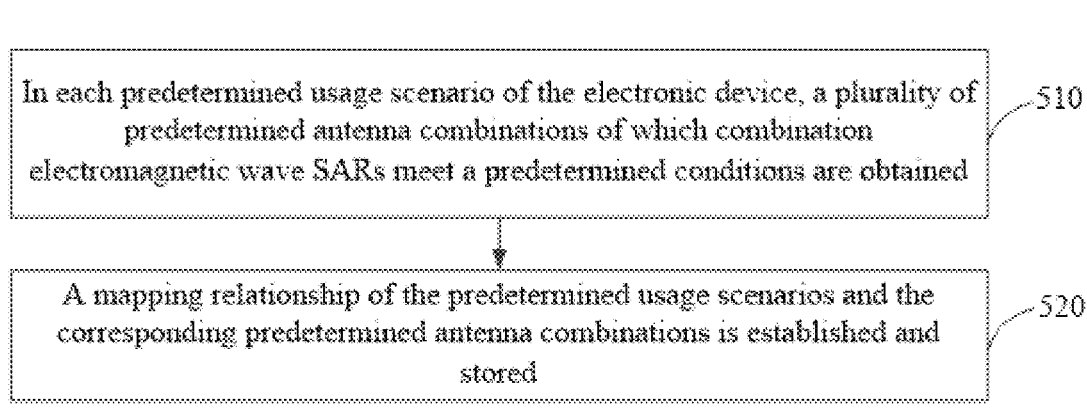
FIG. 6 illustrates a flowchart of a method for obtaining a predetermined antenna combinations according to yet another embodiment of the present disclosure.

FIG. 6 illustrates a flowchart of a method for obtaining a plurality of predetermined antenna combinations according to another embodiment of the present disclosure. The method includes operation 510 and operation 520.

In operation 510, in each predetermined usage scenario of the electronic device 110, a plurality of predetermined antenna combinations of which combination electromagnetic wave SARs meet a predetermined conditions are obtained.

In operation 520, a mapping relationship of the predetermined usage scenarios and the corresponding predetermined antenna combinations is established and stored.

The predetermined usage scenarios of the electronic device 110 can be distances of user's target parts, for example, an ear or a head, and the electronic device 110.

When the distances of the user's target parts and the electronic device 110 are different, the corresponding predetermined antenna combinations are also different. For example, when the distance between the user's target part and the electronic device 110 is 1 cm, there are two predetermined antenna combinations. When the distance between the user's target part and the electronic device 110 is 10 cm, there are five predetermined antenna combinations. When the distance between the user's target part is farther, the number of the predetermined antenna combinations is more.

In the embodiment of the present disclosure, the predetermined usage scenarios are established. A corresponding predetermined antenna combination is obtained for each of the predetermined usage scenarios, and the mapping relationship of the predetermined usage scenarios and the corresponding predetermined antenna combinations is stored.

In one embodiment. Three predetermined usage scenarios are established, and the distance between the user's ear and the electronic device 110 is 10 cm, 5 cm, or 1 cm. In the first predetermined usage scenario (10 cm), there are three predetermined antenna combinations including a predetermined set 1 of antenna combinations, a predetermined set 2 of antenna combinations, and a predetermined set 3 of antenna combinations. In the second predetermined usage scenario (5 cm), there are two predetermined antenna combinations including a predetermined set 1' of antenna combinations and a predetermined set 2' of antenna combinations. In the third predetermined usage scenario (1 cm), there is one predetermined antenna combination includes a predetermined antenna combinations 1". The predetermined set 1 of antenna combinations, the predetermined set 1' of antenna combinations, and the predetermined set 1' of antenna combinations can be the same or different. The predetermined set 2 of antenna combinations and the predetermined set 2' of antenna combinations can be the same or different.

Figure 7:
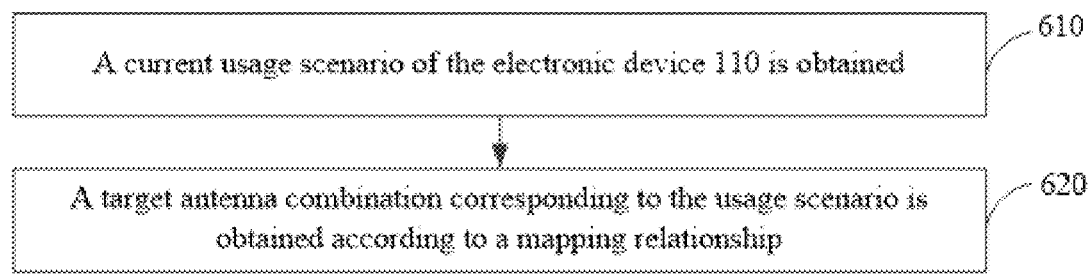
FIG. 7 illustrates a flowchart of a method for obtaining a target antenna combination according to a plurality of predetermined antenna combinations according to another embodiment of the present disclosure.

FIG. 7 illustrates a flowchart of a method for obtaining a target antenna combination according to a plurality of predetermined antenna combinations according to another embodiment of the present disclosure. The method includes operation 610 and operation 620.

In operation 610, a current usage scenario of the electronic device 110 is obtained.

In operation 620, a target antenna combination corresponding to the usage scenario is obtained according to a mapping relationship.

In one embodiment, when the electronic device 110 is in the dual connectivity mode and a current combination SAR of the electronic device 110 does not meet the CE standard, the current usage scenario of the electronic device 110 is obtained. The mapping relationship stored in the electronic device 110 is queried according to the usage scenario, so as to obtain the predetermined antenna combination corresponding to the current usage scenario, and to obtain the target antenna combination from the predetermined antenna combination.

For example, the current usage scenario of the electronic device 110 is that the distance between the user's ear and the electronic device 110 is 5 cm. By querying the mapping relationship, there are two predetermined antenna combinations corresponding to the current usage scenario. The two predetermined antenna combinations include a set 1' of antenna combinations and a set 2' of antenna combinations. One of the two predetermined sets 1' and 2' of antenna combinations is selected as the target antenna combination.

In the embodiment of the present disclosure, by obtaining the current usage scenario of the electronic device 110, the target antenna combination corresponding to the usage scenario is obtained according to the mapping relationship. As such, the antennas can be switched more accurately, and the combination SAR of the electronic device 110 can be ensured to meet the predetermined condition in real time.

It should be understood that although the steps in the flowcharts of FIGS. 2-7 are sequentially displayed in accordance with the indications of the arrows, the steps are not necessarily performed in the order indicated by the arrows. Except as explicitly stated herein, the execution of these steps is not strictly limited, and can be performed in other orders. Moreover, at least some of the steps in FIGS. 2-7 can include multiple sub-steps or multiple stages, which are not necessarily performed at the same time, but can be executed at different times. The order of execution is not necessarily performed sequentially but can be performed alternately or alternately with at least a portion of other steps or sub-steps or stages of other steps.

Figure 8:
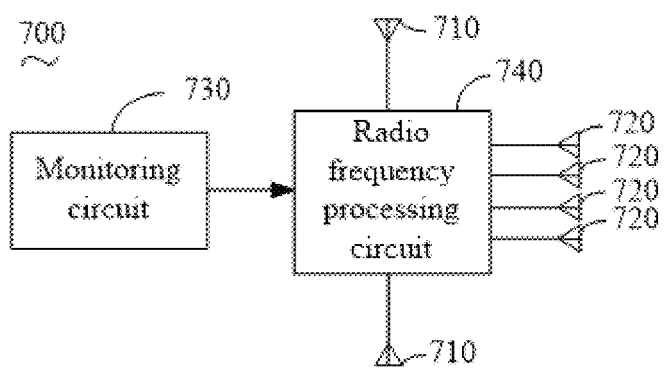
FIG. 8 illustrates a structural block diagram of an antenna control system provided by one embodiment.

FIG. 8 illustrates a structural block diagram of an antenna control system 700 provided by one embodiment. The antenna control system 700 includes at least one first antenna 710, a plurality of second antennas 720, a monitoring circuit 730, and a radio frequency processing circuit 740.

The at least one first antenna 710 is configured to radiate first antenna signals. The second antennas 720 are configured to radiate second antenna signals.

Figure 9:
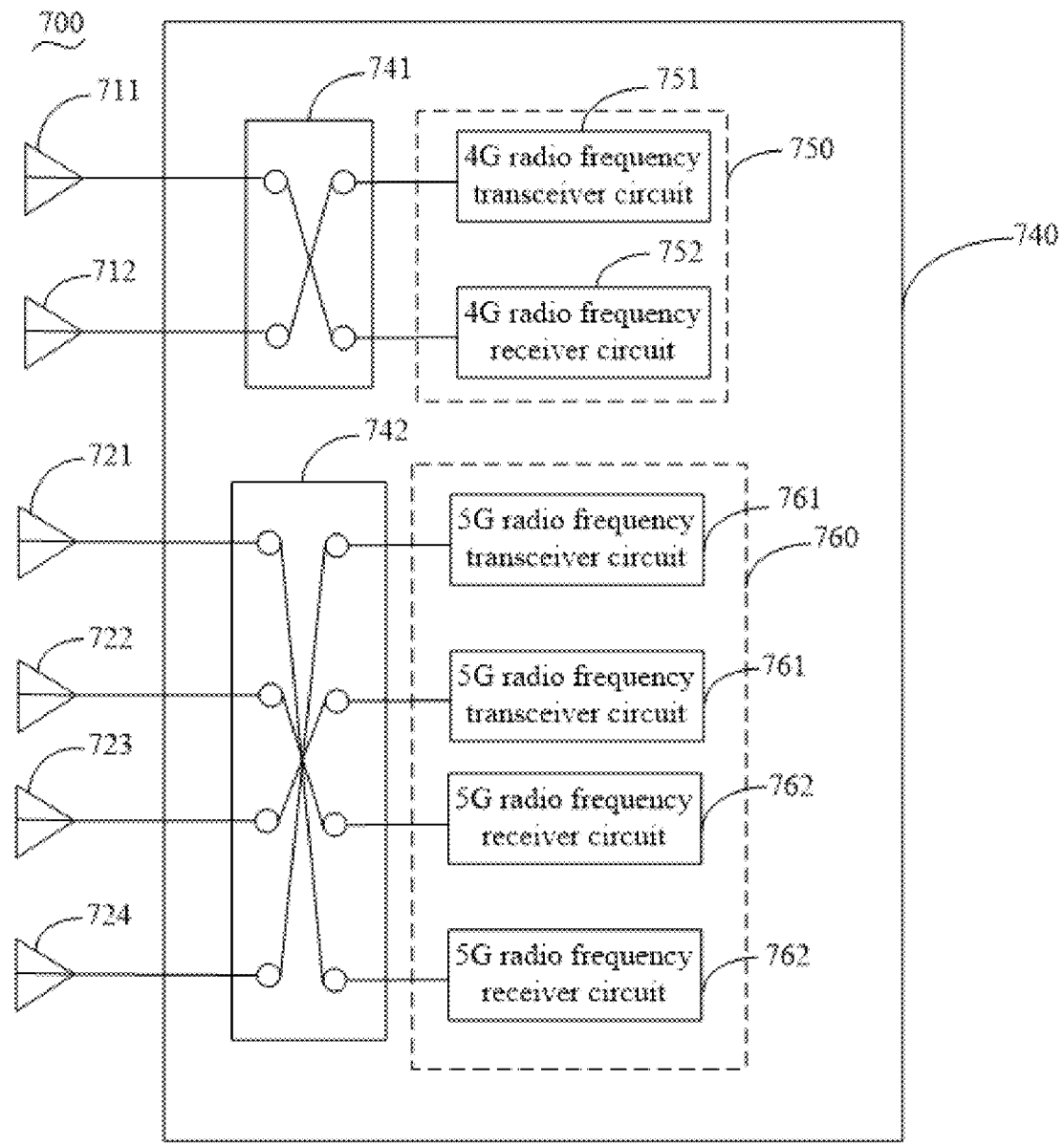
FIG. 9 illustrates a structural block diagram of an antenna control system provided by another embodiment, of the present disclosure.

For example, as shown in FIG. 9, the first antennas are 4G antennas, and the second antennas are 5G antennas. In the present embodiment, there are two 4G antennas including an upper antenna 711 and a lower antenna 712. There are four 5G antennas including a 5G antenna 1, a 5G antenna 2, a 5G antenna 3, and a 5G antenna 4. The 5G antenna 1, the 5G antenna 2, the 5G antenna 3, and the 5G antenna 4 are marked as 721, 722, 723, and 724.

Figure 10:
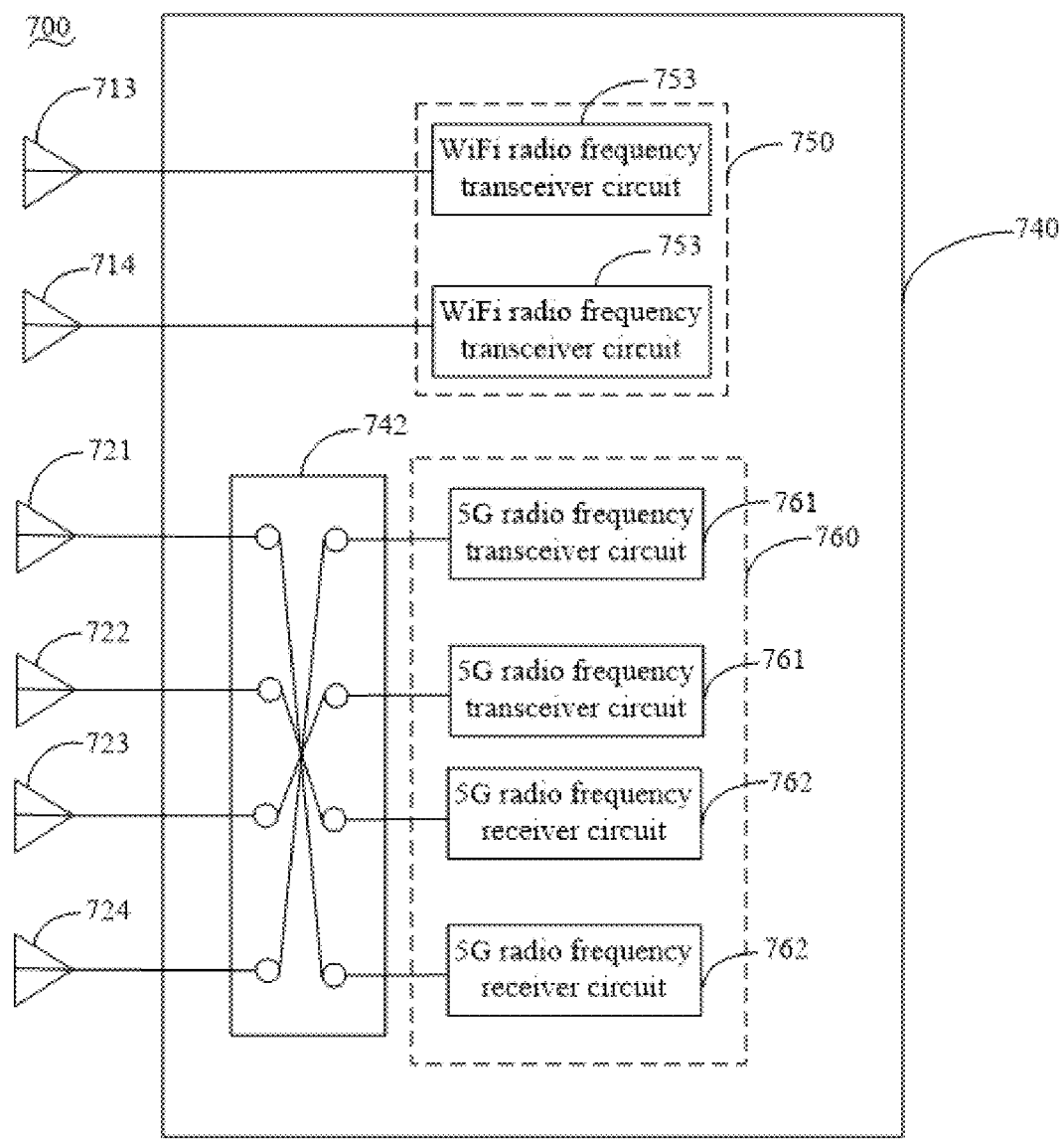
FIG. 10 illustrates a structural block diagram of an antenna control system provided by yet another embodiment of the present disclosure.

As another example, as shown in FIG. 10, the first antennas are WiFi antennas, and the second antennas are 5G antennas. In the present embodiment, there are two WiFi antennas including a WiFi antenna 1 and a WiFi antenna 2. The WiFi antenna 1 and the WiFi antenna 2 are marked as 713 and 714. There are four 5G antennas including a 5G antenna 1, a 5G antenna 2, a 5G antenna 3, and a 5G antenna 4. The 5G antenna 1, the 5G antenna 2, the 5G antenna 3, and the 5G antenna 4 are marked as 721, 722, 723, and 724.

The monitoring circuit 730 is configured to monitor operating states of the at least one first antenna 710 and the second antennas 720.

The radio frequency processing circuit 740 is connected to the at least one first antenna 710 and the second antennas 720. The radio frequency processing circuit 740 is configured to obtain, when the electronic device 110 radiates the first antenna signals and the second antenna signals simultaneously, a combination electromagnetic wave SAR of at least one first antenna 710 currently in the operating state and at least one of the second antennas 720 currently in the operating state which radiate the antenna signals simultaneously.

When the combination electromagnetic wave SAR does not meet a predetermined condition, a target antenna combination including a first target antenna and a second target antenna is called from a plurality of predetermined antenna combinations.

The first target antenna is controlled to be in the operating state for radiating the first antenna signals, and the second target antenna is controlled to be in the operating state for radiating the second antenna signals simultaneously.

In the embodiment of the present disclosure, when the electronic device 110 radiates the first antenna signals and the second antenna signals simultaneously, the radio frequency processing circuit 740 is configured to obtain the combination electromagnetic wave SAR of the at least one first antenna 710 currently in the operating state and the at least one of second antennas 720 currently in the operating state which radiate the antenna signals simultaneously. When the combination electromagnetic wave SAR does not meet the predetermined condition, the target antenna combination including the first target antenna and the second target antenna is called. The first target antenna is controlled to be in the operating state for radiating the first antenna signals, and the second target antenna is controlled to be in the operating state for radiating the second antenna signals simultaneously, thereby reducing the combination SAR when a plurality of antennas are operated simultaneously.

FIG. 9 illustrates a structural block diagram of an antenna control system 700 provided by another embodiment of the present disclosure. As shown in FIG. 9, the radio frequency processing circuit 740 further includes a first radio frequency circuit 750, a second radio frequency circuit 760, a first switch 741 connected between the first radio frequency circuit 750 and the upper antenna 711 and the lower antenna 712, and a second switch 742 connected between the second radio frequency circuit 760 and the 5G antenna 721, the 5G antenna 722, the 5G antenna 723, and the 5G antenna 724.

When a combination SAR of the at least one first antennas currently in the operating state and the at least one second antenna currently in the operating state which radiate the signals simultaneously does not meet the CE standard, the first switch 741 is controlled to turn on a connecting path from the first radio frequency circuit 750 to a first target antenna, and the second switch 742 is controlled to turn on a connecting path from the second radio frequency circuit 760 to a second target antenna, so that the first target antenna and the second target antenna radiate the first antenna signals and the second antenna signals simultaneously.

The radio frequency processing circuit 740 includes a first radio frequency circuit 750 and a second radio frequency circuit 760. The first radio frequency circuit 750 includes one 4G radio frequency transceiver circuit 751 and one 4G radio frequency receiver circuit 752. The second radio frequency circuit 760 includes two 5G radio frequency transceiver circuits 761 and two 5G radio frequency receiver circuits 762.

When the target antenna combination includes the upper antenna 711 and the 5G antenna 3, the first switch 741 turns on the connecting path between the upper antenna 711 and the 4G radio frequency transceiver circuit 751, and the second switch 742 turns on the 5G antenna 3 and the 5G radio frequency transceiver circuit 761, so that the upper antenna 711 and the 5G antenna 3 radiate the first antenna signals and the second antenna signals simultaneously.

In one embodiment, before the target antenna combination including the first target antenna and the second target antenna is called, the antenna control system 700 further executes: establishing a plurality of antenna combinations capable of radiating the first antenna signals and the second antenna signals simultaneously, wherein each of the antenna combinations includes one first antenna and one second antenna or includes one first antenna and two second antennas; obtaining a combination electromagnetic wave SAR of the one first antenna and the one or two second antennas of each of the antenna combinations which radiate the antenna signals simultaneously; obtaining a plurality of predetermined antenna combinations of which combination SARs meet a predetermined condition; and obtaining a target antenna combination according to the plurality of predetermined antenna combinations.

FIG. 10 illustrates a structural block diagram of an antenna control system 700 provided by yet another embodiment of the present disclosure. As shown in FIG. 10, the radio frequency processing circuit 740 further includes a second switch 742 connected between a second radio frequency circuit 760 and a 5G antenna 721, a 5G antenna 722, a 5G antenna 723, and a 5G antenna 724.

When a combination SAR of the at least one first antenna currently in the operating state and the at least one second antenna currently in the operating state which radiate the signal simultaneously does not meet the CE standard, the second switch 742 is controlled to turn on a connecting path from the second radio frequency circuit 760 to a second target antenna, so that the first target antenna and the second target antenna radiate the first antenna signals and the second antenna signals simultaneously.

The radio frequency processing circuit 740 includes a first radio frequency circuit 750 and the second radio frequency circuit 760. The first radio frequency circuit 750 includes two WiFi radio frequency transceiver circuits 753. The second radio frequency circuit 760 includes two 5G radio frequency transceiver circuits 761 and two 5G radio frequency receiver circuits 762.

When the target antenna combination includes a WiFi antenna 1, a WiFi antenna 2, and a 5G antenna 3, connecting paths between the WiFi antennas and the WiFi radio frequency transceiver circuits 753 are directly turned on, and the second switch 742 turns on a connecting path between the 5G antenna 3 and the 5G radio frequency transceiver circuit 761, so that the WiFi antenna 1, the WiFi antenna 2, and the 5G antenna 3 radiate the first antenna signals and the second antenna signals simultaneously.

In one embodiment, before the target antenna combination including the first target antenna and the second target antenna is called, the antenna control system 700 further executes: establishing a plurality of antenna combinations capable of radiating first antenna signals and second antenna signals simultaneously, wherein each antenna combination includes two first antennas and one second antenna or includes two first antenna and two second antennas; obtaining a combination electromagnetic wave SAR of the two first antennas and the one or two second antennas of each antenna combination which radiate the antenna signals simultaneously; obtaining a plurality of predetermined antenna combinations of which combination SARs meet a predetermined condition; and obtaining a target antenna combination according to the plurality of predetermined antenna combinations.

In one embodiment, obtaining the target antenna combination according to the plurality of predetermined antenna combinations includes: selecting a predetermined antenna combination randomly from the plurality of predetermined antenna combinations as the target antenna combination.

In one embodiment, obtaining the target antenna combination according to the plurality of predetermined antenna combinations includes: obtaining first identification information of at least one first antenna currently in the operating state and second identification information of at least one second antenna currently in the operation state; obtaining third identification information of at least one first antenna and the fourth identification information of at least one second antenna in each of the predetermined antenna combinations; obtaining, for each of the predetermined antenna combinations, a first number that the third identification information is the same as the first identification information and a second number that the second identification information is the same as the fourth identification information; and selecting a predetermined antenna combination with a largest sum of the first number and the second number as the target antenna combination.

In one embodiment, obtaining the plurality of predetermined antenna combinations of which the combination SARs meet the predetermined condition includes: obtaining a plurality of predetermined antenna combinations of which the electromagnetic wave SARs meet the predetermined condition in each usage scenario of the electronic device 110; and establishing and storing a mapping relationship of predetermined usage scenarios and corresponding predetermined antenna combinations.

In one embodiment, obtaining the target antenna combination according to the plurality of predetermined antenna combinations includes: obtaining a current usage scenario of the electronic device 110; and obtaining the target antenna combination corresponding to the usage scenario according to the mapping relationship.

In one embodiment, obtaining the combination electromagnetic wave SAR of the first antenna and the second antenna which radiate the antenna signals simultaneously includes: obtaining a maximum transmission power of at least one first antennas and a maximum transmission power of at least one second antenna; obtaining, according to the maximum transmission power of the at least one first antenna and the maximum transmission power of the at least one second antenna, a combination electromagnetic SAR of the at least one first antenna and the at least one second antenna which radiate the antenna signals simultaneously.

In one embodiment, the at least one first antenna is a 4G antenna, and the second antennas are 5G antennas. Correspondingly, the first radio frequency circuit 750 is a 4G radio frequency circuit, and the second radio frequency circuit 760 is a 5G radio frequency circuit.

In one embodiment, the at least one first antenna is a WiFi antenna, and the second antennas are 5G antennas. Correspondingly, the first radio frequency circuit 750 is a WiFi radio frequency circuit, and the second radio frequency circuit 760 is a 5G radio frequency circuit.

The division of each module in the antenna control system 700 is for illustrative purposes only. In other embodiments, the antenna control system 700 may be divided into different modules as needed to complete all or part of the functions of the antenna control system 700.

A specific limitation on the antenna control system 700 can be referred to the limitation on the above-mentioned antenna control method above. Details are not described herein again. Each module in the antenna control system 700 can be implemented in whole or in part by software, hardware, or a combination thereof. The above-mentioned modules can be built in or independent of a processor of a computer device in a hardware form, or can be stored in a memory of the computer device in a software form, so that the processor invokes and performs an operation corresponding to each of the above-mentioned modules.

The implementation of each module of the antenna control system 700 provided by the embodiments of the present disclosure can be in the form of a computer program. The computer program can run on a terminal device or a server. The program modules of the computer program can be stored in the memory of the terminal device or server. When the computer program is executed by the processor, the operations of the method described in the embodiments of the present disclosure are executed.

One embodiment of the present disclosure further provides a computer-readable storage medium which is one or more non-transitory computer readable storage media contains programs including computer executable instructions. When the programs are executed by one or more processors, cause the processor to perform the steps of the antenna control method.

A computer program product includes instructions. When the computer program product runs on a computer, the computer is enabled to perform the antenna control method.

One embodiment of the present disclosure further provides an electronic device 110. The electronic device 110 includes at least one first antenna for radiating first antenna signals, a plurality of second antennas for radiating second antenna signals, a monitoring circuit, a radio frequency processing circuit, at least one memory, and at least one processor. The at least one memory comprising computer programs stored thereon. The computer programs configured to, with the at least one processor, cause the electronic device 110 to perform the antennal control method of the present disclosure.

Figure 11:
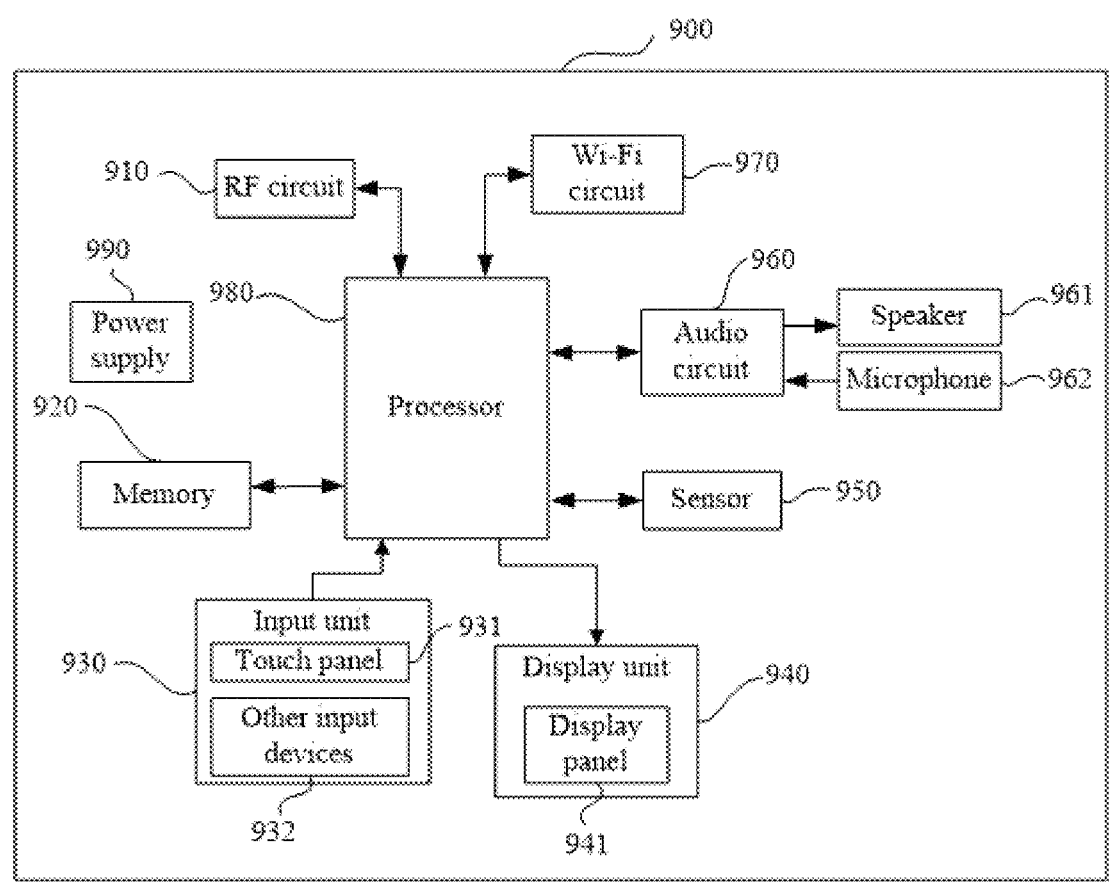
FIG. 11 illustrates a structural diagram showing a part of a structure of a mobile phone related to the terminal provided by the embodiment of the present disclosure.

The electronic device 110 includes a terminal. As shown in FIG. 11, for the convenience of description, only parts related to the embodiments of the present disclosure are shown, and specific technical details not disclosed can be referred to the methods of the embodiments. The terminal can be any terminal device including a mobile phone, a tablet computer, a personal digital assistant (PDA), a point of sales (POS), a vehicle-mounted computer, a wearable device or the like.

FIG. 11 illustrates a structural diagram showing a part of a structure of a mobile phone 900 related to the terminal provided by the embodiment of the present disclosure. Referring to FIG. 11, the mobile phone 900 includes: a radio frequency (RF) circuit 910, a memory 920, an input unit 930, a display unit 940, a sensor 950, an audio circuit 960, a Wi-Fi circuit 970, a processor 980, and a power supply 990. The RF circuit 910 includes the 5G radio frequency circuit (the 5G radio frequency transceiver circuits 761 and the 5G radio frequency receiver circuits 762) and/or the 4G radio frequency circuit (the 4G radio frequency transceiver circuit 751 and the 4G radio frequency receiver circuit 752). The WiFi circuit 970 includes the WiFi radio frequency transceiver circuits 753. It can be understood by those skilled in the art that the structure shown in FIG. 11 does not constitute a limitation, and can include more or less components than those illustrated, or some components can be combined, or different components can be arranged.

The RF circuit 910 can be configured to receive and transmit information during the transmission or reception of information, and can receive and send the downlink information of the base station for the processor 980 to process, and then send the uplink data to the base station. Generally, the RF circuit 910 includes, but is not limited to, an antenna, at least one amplifier, a transceiver, a coupler, a Low Noise Amplifier (LNA), a duplexer, and the like. In addition, the RF circuitry 910 can also communicate with the network and other devices via wireless communication. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), e-mail, Short Messaging Service (SMS) or the like.

The memory 920 can be configured to store software programs and modules, and the processor 980 executes various functional applications and data processing of the mobile phone 900 by running software programs and modules stored in the memory 920. The memory 920 can mainly include a program storage area and a data storage area, wherein the program storage area may store an operating system, an application required for at least one function (such as an application of a sound playing function, an application of an image playing function, etc.). The data storage area can store data (such as audio data, address book, etc.) created according to the use of the mobile phone 900. Moreover, the memory 920 can include high-speed random-access memory, and can also include non-volatile memory, such as at least one magnetic disk storage device, flash memory device, or other volatile solid-state storage device.

The input unit 930 can be configured to receive input numeric or character information and to generate key signal inputs related to user settings and function control of the mobile phone 900. Specifically, the input unit 930 can include a touch panel 931 and other input devices 932. The touch panel 931, also referred to as a touch screen, can collect touch operations on or near the screen (such as the user using a finger, a stylus, or the like on the touch panel 931 or near the touch panel 931) and drive the corresponding connection device according to a preset program. In one embodiment, the touch panel 931 can include two portions of a touch detection device and a touch controller. The touch detection device detects the touch orientation of the user, detects a signal brought by the touch operation, and transmits the signal to the touch controller. The touch controller receives the touch information from the touch detection device, converts the touch information into contact coordinates, sends the contact coordinates to the processor 980, and can receive and execute commands from the processor 980. Furthermore, the touch panel 931 can be implemented in one of various types, such as a resistance type, a capacitance type, an infrared type, a surface acoustic wave type and the like. In addition to the touch panel 931, the input unit 930 can also include other input devices 932. In particular, other input devices 932 can include, but are not limited to, one or more physical keyboards, function keys (such as volume control buttons, switch buttons, etc.).

The display unit 940 can be used to display information input by the user or information provided to the user as well as various menus of the mobile phone. The display unit 940 can include a display panel 941. In one embodiment, the display panel 941 can be configured in the form of a liquid crystal display (LCD), an organic light-emitting diode (OLED), or the like. In one embodiment, the touch panel 931 can cover the display panel 941. When the touch panel 931 detects a touch operation thereon or nearby, the touch panel 931 transmits to the processor 980 to determine the type of the touch event, and then the processor 980 provides a corresponding visual output on display panel 941 according to the type of touch event. Although the touch panel 931 and the display panel 941 are used as two independent components to implement the input and input functions of the mobile phone 900 in FIG. 11, the touch panel 931 can be integrated with the display panel 941 to realize the input and output functions of the mobile phone 900 in some embodiments.

The mobile phone 900 can also include at least one type of sensor 950, such as a light sensor, a motion sensor, and other sensors. Specifically, the light sensor can include an ambient light sensor and a proximity sensor. The ambient light sensor can adjust the brightness of the display panel 941 according to the brightness of the ambient light, and the proximity sensor can close the display panel 941 and/or backlight when the mobile phone 900 moves to the ear. The motion sensor can include an acceleration sensor. The acceleration sensor can detect the magnitude of the acceleration in each direction. The magnitude and direction of the gravity can be detected at rest, and can be used to identify the gesture of the mobile phone 900 (such as horizontal and vertical screen switching) and vibration recognition related functions (such as Pedometer, tapping, etc.). Furthermore, the mobile phone 900 can also be equipped with gyroscopes, barometers, hygrometers, thermometers, infrared sensors and other sensors.

The audio circuit 960, a speaker 961 and a microphone 962 can provide an audio interface between the user and the mobile terminal 900. The audio circuit 960 can transmit an electric signal obtained by converting received audio data to the speaker 961. The electric signal is converted into a sound signal to be outputted by the speaker 961. On the other hand, the microphone 962 converts a collected sound signal into an electric signal. The audio circuit 960 receives the electric signal and converts the electric signal into audio data. After the audio data is outputted to the processor 980 and is processed, it can be transmitted to another mobile phone through the RF circuit 910, or can be outputted to the memory 920 in order to be further processed.

Wi-Fi is a short-range wireless transmission technology. The mobile terminal 900 can help the user to receive and send E-mails, browse webpages, access streaming media and the like by the WiFi circuit 970. The WiFi circuit 970 provides wireless broadband internet access for the user. Although the WiFi circuit 970 is shown in FIG. 9, it should be understood that the WiFi circuit 970 is not the necessary part of the mobile terminal 900 and can completely be omitted as required.

The processor 980 is a control center of the mobile terminal 900, is connected with all the parts of the whole mobile phone 900 by various interfaces and lines and is configured to execute various functions of the mobile terminal 900 and process the data by operating the software programs and/or the modules stored in the memory 920, and to call the data stored in the memory 920 so as to carry out integral monitoring on the mobile phone. Optionally, the processor 980 can include one or more processing cores. In some embodiments, the processor 980 can be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor can also be not integrated into the processor 980. For example, the processor 980 can integrate an application processor and a baseband processor. The baseband processor and other peripheral chips can form a modulation/demodulation processor.

The mobile phone 900 further includes a power supply 990 (such as a battery) which supplies power to various components. For example, the power supply 990 can be logically coupled to the processor 980 via a power management system to enable management of charging, discharging, and power consumption through the power management system.

In one embodiment, the mobile phone 900 can also include a camera, a BLUETOOTH circuit or the like.

In the embodiment of the present disclosure, the processor included in the mobile phone 900 implements the above-mentioned antenna control method when executing the computer programs stored in the memory.

Any reference to a memory, storage, database, or other medium used herein can include a non-transitory and/or transitory memory. Suitable non-transitory memories can include a read-only memory (ROM), a programmable ROM (PROM), an electrically programmable ROM (EPROM), an electrically erasable programmable ROM (EEPROM), or a flash memory. The transitory memory can include a random-access memory (RAM), which acts as an external cache. For illustration rather than limitation, the RAM is available in a variety of forms, such as a static RAM (SRAM), a dynamic RAM (DRAM), a synchronous DRAM (SDRAM), a double data rate SDRAM (DDR SDRAM), an enhanced SDRAM (ESDRAM), a synchronization link DRAM (SLDRAM), a Rambus direct RAM (RDRAM), a direct Rambus dynamic RAM (DRDRAM), and a Rambus dynamic RAM (RDRAM).

The above-mentioned embodiments are merely illustrative of several embodiments of the present invention, and the description thereof is more specific and detailed, but is not to be construed as limiting the scope of the invention. It should be noted that a number of variations and modifications may be made by those skilled in the art without departing from the scope of the present invention. Therefore, the protection scope of the present invention should be determined by the appended claims.

What is claimed is:

1. An antenna control method, for an electronic device, the electronic device comprising one first antenna for radiating first antenna signals and a plurality of second antennas for radiating second antenna signals, the method comprising:

establishing a plurality of antenna combinations capable of radiating the first antenna signals and the second antenna signals simultaneously, wherein each of the plurality of antenna combinations comprises a first antenna and one of the plurality of second antennas;

for each of the plurality of antenna combinations, obtaining, in response to the first antenna and the one of the plurality of second antennas radiating the first antenna signals and the second antenna signals simultaneously, a combination electromagnetic wave specific absorption rate (SAR) of each of the plurality of antenna combinations;

obtaining a plurality of predetermined antenna combinations of which combination electromagnetic wave SARs meet a predetermined condition;

obtaining a target antenna combination according to the plurality of predetermined antenna combinations;

obtaining, in response to the electronic device radiating the first antenna signals and the second antenna signals simultaneously, a combination electromagnetic wave SAR of the first antenna and one of the plurality of second antennas in an operating state;

calling, in response to the combination electromagnetic wave SAR not meeting a predetermined condition, the target antenna combination including a first target antenna and a second target antenna; and controlling the first target antenna and the second target antenna to be in the operating state for radiating the first antenna signals and the second antenna signals simultaneously.

2. The method of claim 1, wherein the first antenna is plural, the electronic device comprises a first radio frequency circuit, a second radio frequency circuit, a first switch connected between the first radio frequency circuit and a plurality of first antennas, and a second switch connected between the second radio frequency circuit and the plurality of second antennas, the controlling the first target antenna and the second target antenna to be in the operating state comprises:

controlling the first switch to turn on a connecting path from the first radio frequency circuit to the first target antenna and controlling the second switch to turn on a connecting path from the second radio frequency circuit to the second target antenna.

3. The method of claim 1, wherein the first antenna is of the first target antenna, the electronic device comprises a first radio frequency circuit connected to the first antenna, a second radio frequency circuit, and a switch connected between the second radio frequency circuit and the plurality of second antennas, the controlling the first target antenna and the second target antenna to be in the operating state comprises:

controlling the first target antenna to be in the operating state and controlling the switch to turn on a connecting path from the second radio frequency circuit to the second target antenna.

4. The method of claim 1, wherein each of the plurality of antenna combinations comprises the first antenna and two of the plurality of second antennas; and the step of obtaining a combination electromagnetic wave SAR of each of the plurality of antenna combinations is in response to the first antenna and the two of the plurality of second antennas radiating the first antenna signals and the second antenna signals simultaneously.

5. The method of claim 4, wherein the obtaining the plurality of predetermined antenna combinations of which the combination electromagnetic wave SARs meet the predetermined condition comprises:

obtaining, in each predetermined usage scenario of the electronic device, the plurality of predetermined antenna combinations of which the combination electromagnetic wave SARs meet the predetermined conditions; and establishing and storing a mapping relationship of predetermined usage scenarios and the predetermined antenna combinations.

6. The method of claim 5, wherein the obtaining the target antenna combination according to the plurality of predetermined antenna combinations comprises:

obtaining a usage scenario of the electronic device; and obtaining the target antenna combination corresponding to the usage scenario according to the mapping relationship.

7. The method of claim 1, wherein the obtaining the target antenna combination according to the plurality of predetermined antenna combinations comprises:

obtaining first identification information of the first antennas currently in the operating state, and obtaining second identification information of one of the plurality of second antennas currently in the operating state;

obtaining third identification information of the first antenna and fourth identification information of one of the plurality of second antennas in each of the predetermined antenna combinations;

obtaining, for each of the predetermined antenna combinations, a first number that the third identification information is the same as the first identification information and a second number that the second identification information is the same as the fourth identification information; and selecting one of the plurality of predetermined antenna combinations with a largest sum of the first number and the second number as the target antenna combination.

8. The method of claim 1, wherein the step of obtaining, in response to the first antenna and the one of the plurality of second antennas radiating the first antenna signals and the second antenna signals simultaneously, the combination electromagnetic wave SAR of each of the plurality antenna combinations comprises:

obtaining a maximum transmission power of the first antenna and a maximum transmission power of the one or two of the plurality of second antennas; and obtaining, in response to the first antenna and the one of the plurality of second antennas radiating the first antenna signals and the second antenna signals simultaneously, and according to the maximum transmission power of the first antenna and the maximum transmission power of the one of the plurality of second antennas, the combination electromagnetic wave SAR of the first antenna and the one or two of the plurality of second antennas.

9. The method of claim 8, further comprising:

decreasing, in response to the first antenna transmitting the first antenna signals using the maximum transmission power and the one of the plurality of second antennas transmitting the second antenna signals using the maximum transmission power, the maximum transmission power of the first antenna and/or the maximum transmission power of the one of the plurality of second antennas until the plurality of predetermined antenna combinations which meet the predetermined condition are obtained.

10. The method of claim 1, wherein the first antenna is plural;

each of the plurality of antenna combinations comprises two of a plurality of first antennas and one of the plurality of second antennas; and the step of obtaining a combination electromagnetic wave SAR of each of the plurality of antenna combinations is in response to the two of the plurality of first antennas and the one of the plurality of second antennas radiating the first antenna signals and the second antenna signals simultaneously.

11. The method of claim 1, wherein the first antenna is plural, each of the plurality of antenna combinations comprises two of a plurality of first antennas and two of the plurality of second antennas; and the step of obtaining a combination electromagnetic wave SAR of each of the plurality of antenna combinations is in response to the two of the plurality of first antennas and the two of the plurality of second antennas radiating the first antenna signals and the second antenna signals simultaneously.

12. An antenna control system, for an electronic device, comprising:
> one first antenna configured to radiate first antenna signals;
> a plurality of second antennas configured to radiate second antenna signals;
> a monitoring circuit configured to monitor operating states of the first antenna and the plurality of second antennas; and
> a radio frequency processing circuit connected to the first antenna and the plurality of second antennas and configured to perform:
> establishing a plurality of antenna combinations capable of radiating the first antenna signals and the second antenna signals simultaneously, wherein each of the plurality of antenna combinations comprises a first antenna and one of the plurality of second antennas;
> for each of the plurality of antenna combinations, obtaining, in response to the first antenna and the one of the plurality of second antennas radiating the first antenna signals and the second antenna signals simultaneously, a combination electromagnetic wave specific absorption rate (SAR) of each of the plurality of antenna combinations;
> obtaining a plurality of predetermined antenna combinations of which combination electromagnetic wave SARs meet a predetermined condition; and
> obtaining the target antenna combination according to the plurality of predetermined antenna combinations;
> obtaining, in response to the first antenna and the plurality of second antennas radiating the first antenna signals and the second antenna signals simultaneously, a combination electromagnetic wave SAR of the first antenna and one of the plurality of second antennas in the operating state;
> calling, in response to the combination electromagnetic wave SAR not meeting a predetermined condition, the target antenna combination including a first target antenna and a second target antenna; and
> controlling the first target antenna and the second target antenna to be in the operating state for radiating the first antenna signals and the second antenna signals simultaneously.

13. The antenna control system of claim 12, wherein the first antenna is of the first target antenna, the radio frequency processing circuit comprises a first radio frequency circuit connected to the first antenna, a second radio frequency circuit, and a switch connected between the second radio frequency circuit and the plurality of second antennas, the controlling the first target antenna and the second target antenna to be in the operating state comprises:
> controlling the first target antenna to be in the operating state and controlling the switch to turn on a connecting path from the second radio frequency circuit to the second target antenna.

14. The antenna control system of claim 12,
> wherein each of the plurality of antenna combinations comprises the first antenna and two of the plurality of second antennas;
> the step of obtaining a combination electromagnetic wave SAR of each of the plurality of antenna combinations performed by the radio frequency processing circuit is in response to the first antenna and the two of the plurality of second antennas radiating the first antenna signals and the second antenna signals simultaneously.

15. The antenna control system of claim 12, wherein the obtaining the target antenna combination according to the plurality of predetermined antenna combinations comprises:
> obtaining first identification information of the first antennas currently in the operating state, and obtaining second identification information of the one of the plurality of second antennas currently in the operating state;
> obtaining third identification information of the first antenna and fourth identification information of one of the plurality of second antennas in each of the predetermined antenna combinations;
> obtaining, for each of the predetermined antenna combinations, a first number that the third identification information is the same as the first identification information and a second number that the second identification information is the same as the fourth identification information; and
> selecting one of the plurality of predetermined antenna combinations with a largest sum of the first number and the second number as the target antenna combination.

16. The antenna control system of claim 12, wherein the obtaining the plurality of predetermined antenna combinations of which the combination electromagnetic wave SARs meet the predetermined condition comprises:
> obtaining, in each predetermined usage scenario of the electronic device, the plurality of predetermined antenna combinations of which the combination electromagnetic wave SARs meet the predetermined conditions; and
> establishing and storing a mapping relationship of predetermined usage scenarios and the predetermined antenna combinations, and wherein the obtaining the target antenna combination according to the plurality of predetermined antenna combinations comprises:
> obtaining a usage scenario of the electronic device; and
> obtaining the target antenna combination corresponding to the usage scenario according to the mapping relationship.

17. The antenna control system of claim 12, wherein the step of obtaining, in response to the first antenna and the one of the plurality of second antennas radiating the first antenna signals and the second antenna signals simultaneously, the combination electromagnetic wave SAR of each of the plurality of antenna combinations comprises:
> obtaining a maximum transmission power of the first antenna and a maximum transmission power of the one of the plurality of second antennas; and
> obtaining, in response to the first antenna and the one of the plurality of second antennas radiating the first antenna signals and the second antenna signals simultaneously, and according to the maximum transmission power of the first antenna and the maximum transmission power of the one of the plurality of second antennas, the combination electromagnetic wave SAR of the first antenna and the one of the plurality of second antennas.

18. The antenna control system of claim 12, wherein the first antenna is plural:
> each of the plurality of antenna combinations comprises two of a plurality of first antennas and one of the plurality of second antennas; and
> the step of obtaining a combination electromagnetic wave SAR of each of the plurality of antenna combinations performed by the radio frequency processing circuit is in response to the two of the plurality of first antennas and the one of the plurality of second antennas radiating the first antenna signals and the second antenna signals simultaneously.

19. The antenna control system of claim 12, wherein the first antenna is plural:
   each of the plurality of antenna combinations comprises two of a plurality of first antennas and two of the plurality of second antenna; and
   the step of obtaining a combination electromagnetic wave SAR of each of the plurality of antenna combinations performed by the radio frequency processing circuit is in response to the two of the plurality of first antennas and the two of the plurality of second antennas radiating the first antenna signals and the second antenna signals simultaneously.

20. An electronic device, comprising one first antenna for radiating first antenna signals, a plurality of second antennas for radiating second antenna signals, a monitoring circuit, a radio frequency processing circuit, at least one memory, and at least one processor;
   the at least one memory comprising computer programs stored thereon, the computer programs configured to, with the at least one processor, cause the electronic device to perform:
   establishing a plurality of antenna combinations capable of radiating the first antenna signals and the second antenna signals simultaneously, wherein each of the plurality of antenna combinations comprises a first antenna and one of the plurality of second antennas;
   for each of the plurality of antenna combinations, obtaining, in response to the first antenna and the one of the plurality of second antennas radiating the first antenna signals and the second antenna signals simultaneously, a combination electromagnetic wave specific absorption rate (SAR) of each of the plurality of antenna combinations;
   obtaining a plurality of predetermined antenna combinations of which combination electromagnetic wave SARs meet a predetermined condition; and
   obtaining the target antenna combination according to the plurality of predetermined antenna combinations;
   obtaining, in response to the electronic device radiating the first antenna signals and the second antenna signals simultaneously, a combination electromagnetic wave SAR of the first antenna and one of the plurality of second antennas in an operating state;
   calling, in response to the combination electromagnetic wave SAR not meeting a predetermined condition, the target antenna combination including a first target antenna and a second target antenna; and
   controlling the first target antenna and the second target antenna to be in the operating state for radiating the first antenna signals and the second antenna signals simultaneously.

* * * * *